United States Patent [19]

Schmidt

[11] 4,287,958

[45] Sep. 8, 1981

[54] VEHICLE SUSPENSION WITH FLEXIBLE TRANSVERSAL BEAM

[75] Inventor: Kenneth J. Schmidt, Springfield, Oreg.

[73] Assignee: General Trailer Company, Inc., Springfield, Oreg.

[21] Appl. No.: 84,521

[22] Filed: Oct. 12, 1979

[51] Int. Cl.³ .................... G01G 19/08; G01G 3/14
[52] U.S. Cl. ............................. 177/136; 177/211
[58] Field of Search .................. 177/136, 137, 211

[56] References Cited

U.S. PATENT DOCUMENTS

| | | | |
|---|---|---|---|
| 2,899,191 | 8/1959 | Hunt | 177/211 |
| 3,780,817 | 12/1973 | Videon | 177/136 |
| 3,800,895 | 4/1974 | Gale et al. | 177/136 |
| 3,805,600 | 4/1974 | Powell et al. | 177/137 |
| 3,878,908 | 4/1975 | Andersson et al. | 177/136 |
| 4,042,049 | 8/1977 | Reichow et al. | 177/211 X |
| 4,095,660 | 6/1978 | Johansson | 177/136 |

*Primary Examiner*—George H. Miller, Jr.
*Attorney, Agent, or Firm*—Kolisch, Hartwell & Dickinson

[57] ABSTRACT

A load-monitoring vehicle suspension including a pair of wheel assemblies carried adjacent the opposite ends of a flexible transversal beam which supports the bed in the vehicle. This beam extends transversely of the bed's longitudinal axis, and supports the bed through two spaced journal connections which are disposed inwardly of the wheel assemblies, and which provide for the beam spaced journal axes that generally parallel the bed's longitudinal axis and intersect the beam's longitudinal axis. Load carried on the bed causes the beam to deflect substantially in pure bending, and such deflection is monitored by a strain-sensitive device mounted centrally on the beam.

4 Claims, 9 Drawing Figures

VEHICLE SUSPENSION WITH FLEXIBLE TRANSVERSAL BEAM

BACKGROUND AND SUMMARY OF THE INVENTION

The present invention relates to vehicle suspensions, and in particular, to a suspension usable in monitoring the weight of a vehicle load supported thereby.

Vehicle suspensions adapted to monitor the weights of bed loads are known. These may be single- or twin-axle suspensions, and may be used in supporting the beds of large vehicles such as trucks or trailers. Typically, in the prior art, in monitoring vehicle load weight, a strain gauge or the like is interposed directly between the vehicle bed and the suspension which supports the bed. In this configuration, bed load weight is transferred directly to the strain gauge. This configuration necessitates the use of expensive and heavy-duty strain gauges, and also frequent replacement of these.

It is a general object of the present invention to provide a vehicle suspension in which the just-mentioned problems associated with measuring vehicle load weight are substantially overcome.

A more specific object of the invention is to provide a suspension in which the supported weight of the vehicle is carried on a flexible beam, deflection of which is related to weight supported by the beam, wherein load weight can be measured according to such deflection.

The suspension of the present invention includes a conventional single- or twin-axle ground-traveling structure. A flexible transversal beam is attached to the structure at a pair of laterally spaced beam points and extends transversely of the bed's longitudinal axis. The vehicle bed is mounted on the beam, at another pair of laterally spaced points generally symmetrical with respect to the first-mentioned pair of points, for journaled pivoting about laterally spaced axes generally paralleling the bed's longitudinal axis and intersecting the beam's longitudinal axis. Such pivoting allows generally uniform beam deflection, substantially in pure bending, between the beam's attachment to the ground-traveling structure, when vehicle load weight is applied to the beam. A strain-sensitive device is mounted centrally on the beam for monitoring beam deflection.

In preferred embodiments, the vehicle bed is attached to the suspension through a pair of stub shafts which are joined to the beam with their axes coincident with the above-mentioned spaced pivot axes. The stub shaft axes also intersect the beam's longitudinal axis. The opposed end portions of each stub shaft, which extend from opposed sides of the beam, are received within a pair of casings, and are journaled therein, with such journaling being accommodated by deformation of an elastomeric bushing interposed between each casing and the associated shaft end portion. The vehicle bed is secured to the casings, with beam deflection being accommodated by counterrotative movement of the two stub shafts relative to the casings.

These and other objects and features of the present invention will become more fully apparent when read in connection with the following detailed description of preferred embodiments of the invention, and the accompanying drawings, wherein.

DETAILED DESCRIPTION OF PREFERRED EMBODIMENTS OF THE INVENTION

Figure 1:
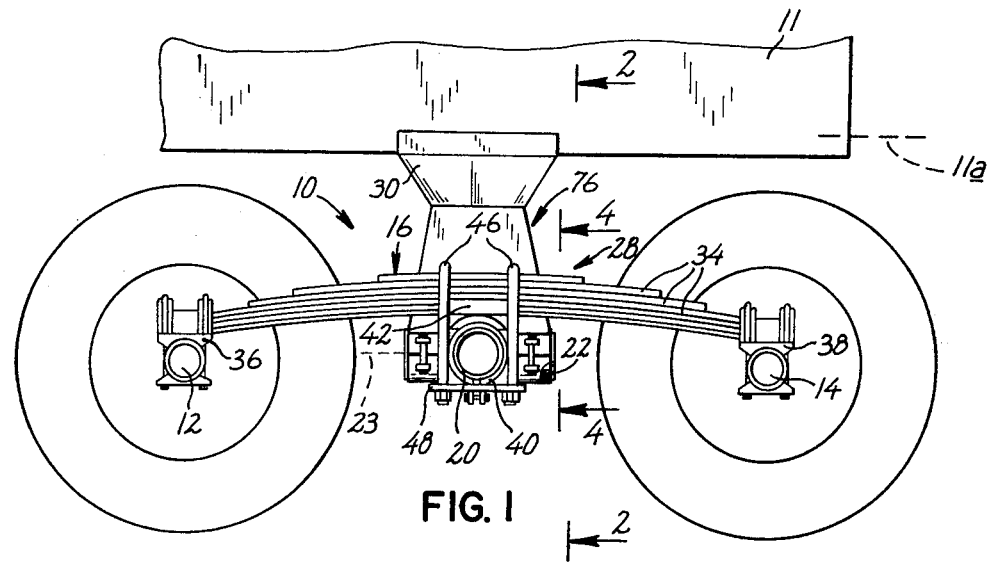
FIG. 1 is a side view of a vehicle suspension constructed according to one embodiment of the present invention, shown with a portion of a supported vehicle bed.
Figure 2:
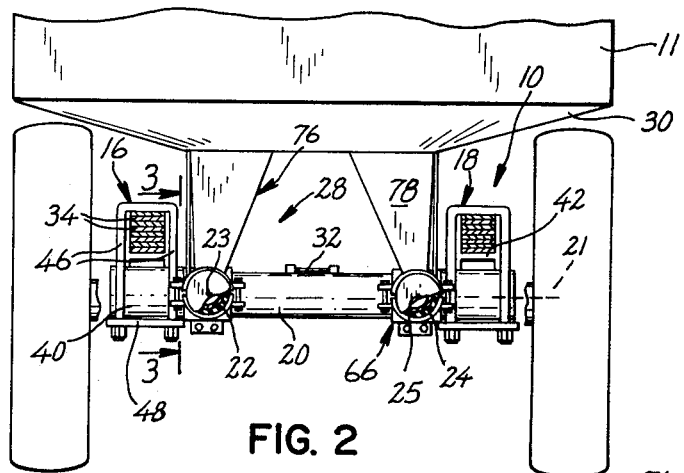
FIG. 2 is a rear view of the suspension of FIG. 1, taken generally along line 2—2 therein.

Looking now at the drawings, and first at FIGS. 1 and 2, there is shown generally at 10 a twin-axle suspension constructed according to the present invention. The suspension is shown here supporting the rear of a truck bed 11, whose longitudinal axis is indicated by a dashed line 11a in FIG. 1. Suspension 10 generally includes a pair of longitudinally spaced, transversely extending axles 12, 14, each having opposed pairs of wheels rotatably supported thereon. Axles 12, 14 are interconnected, at associated axle end regions, by a pair of conventional, laterally spaced spring assemblies 16, 18 (FIG. 2). A flexible transversal beam 20 is mounted, adjacent its end regions, on assemblies 16, 18, with the beam's longitudinal axis—indicated by dashed line 21 in FIG. 2—paralleling the axes of axles 12, 14. Joined to and projecting toward opposite sides of beam 20, inwardly of and disposed symmetrically with respect to, the beam's attachments to assemblies 16, 18, are two longitudinally extending stub shafts 22, 24. The axes of shafts 22, 24, shown at 23, 25, respectively, are parallel to bed axis 11a and intersect axis 21 as seen in the drawings. A clamp assembly, indicated generally at 28, and described in detail below, connects shafts 22, 24 to a bed support 30 on which bed 11 is carried. A conventional strain-sensitive device 32 (FIG. 2) is attached centrally on beam 20, and is used, as will be explained, to monitor beam deflection.

Looking now at details of suspension 10, illustrated in FIGS. 1-4, each spring assembly 16, 18 is composed conventionally of a plurality of leaf springs, such as springs 34. Each assembly, such as assembly 16 seen in FIG. 1, is attached, at is opposed ends, to longitudinally aligned end regions of axles 12, 14 by clamps, such as clamps 36, 38 respectively. The just-described structure including axles 12, 14, assemblies 16, 18 interconnecting the two axles, and the wheels and tires supported thereon, is also referred to herebelow as ground-traveling support means.

Figures 3, 4:
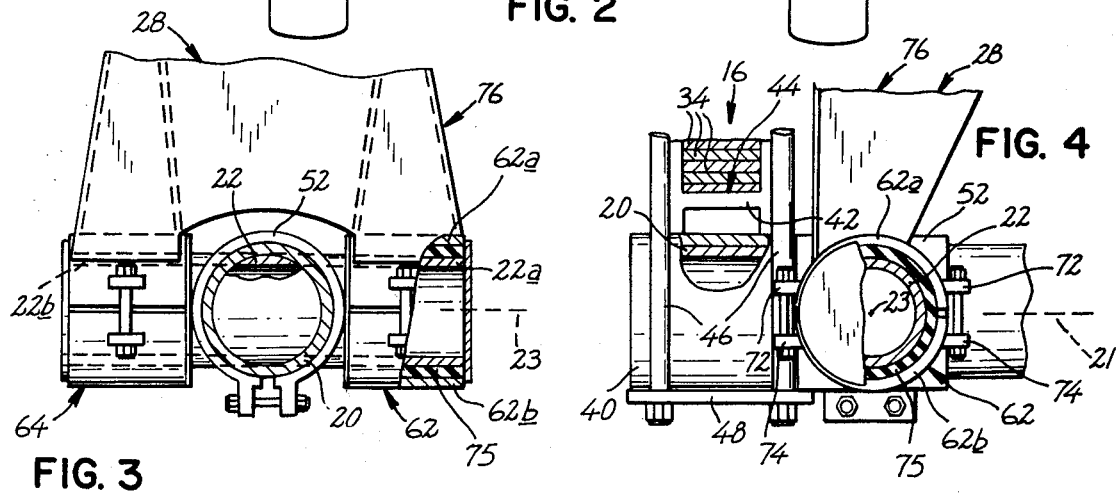
FIG. 3 is an enlarged sectional view, with parts cut away, taken generally along line 3—3 in FIG. 2.
FIG. 4 is an enlarged, sectional view taken generally along line 4—4 in FIG. 1.

Beam 20 is a uniformly flexible tubular member, shown sectionally in FIGS. 3 and 4, formed of a suitable steel alloy, or the like. Beam 20 is mounted at a pair of spaced-apart points adjacent its opposed end regions, on and below central portions of spring assemblies 16, 18 (FIG. 2). Describing the mounting of the beam's left end region in FIGS. 2 and 4 to assembly 16, this end region is carried within a casing 40. Mounted on the top portion of casing 40 is a longitudinally extending I-beam member 42, the channel 44 (FIG. 4) in which is dimensioned to receive therein the lowermost springs of assembly 16. A pair of longitudinally spaced U-bolts 46, upper portions of which contact the uppermost springs 34 of assembly 16, and the lower ends of which extend through suitable openings in a plate 48 disposed below casing 40, serve to clamp the spring assembly to the casing. Casing 40, member 42, and U-bolts 46, mounting the left beam end region in FIGS. 2 and 4 to assembly 16, and similar structure mounting the opposed beam end region to assembly 18, are also referred to herebelow as means operatively attaching the groundtraveling support means to beam 20.

Shafts 22, 24, as illustrated by shaft 22 in FIGS. 3 and 4, are tubular, and are formed of a suitable steel alloy, or the like. The shafts are received and anchored in suitable bores formed in beam 20, and extend at their opposed end portions, such as shaft 22 portions 22a, 22b, from diametrically opposed sides of the beam, along axes 23 (FIG. 3), 25, respectively. Beam 20, where the same receives shaft 22 is encased in an adjustable-diameter reinforcing sleeve 52 having a diametrically extending bore through which shaft 22 is received. A similar sleeve is included at the location of shaft 24.

Referring to FIGS. 2 and 3, assembly 28 generally includes two pairs of spaced cylindrical clamps, or casing means, such as the pair of clamps 62, 64 associated with shaft 22, and the pair including clamp 66 associated with shaft 24 (FIG. 2). The pairs of clamps are rigidly interconnected, in a manner to be described, such that each clamp pair engages opposed end portions of its associated shaft. Each clamp, such as clamp 62 shown in FIGS. 3 and 4, is composed of top and bottom clamp segments, such as segments 62a, 62b, each of which is equipped with a pair of clamping ears, such as ears 72, 74, by which the two segments can be drawn together. Interposed between each stub shaft end portion and the associated clamp of assembly 28, and held tightly therebetween, is a rubber bushing, such as bushing 75, also referred to herebelow as elastomeric bushing means.

Continuing the description of assembly 28, extending between and joining the clamps in the assembly and the underside of support 30 are rigid boxlike legs, such as those shown at 76, 78.

Shafts 22, 24, support 30, and assembly 28 are also referred to herebelow as journal means mounting bed 11 on beam 20 for journaled pivoting about spaced axes 23, 25.

Completing the description of suspension 10, device 32 is mounted on beam 20 in a manner enabling it to respond linearly to bending deformation in the beam. This device is connected in a conventional monitoring circuit including a suitable indicator which indicates the amount of such bending.

In operation, weight placed on bed 11 is transferred to beam 20 through assembly 28 and stub shafts 22, 24. The mechanics of such weight transfer are illustrated in FIG. 5, wherein line 21 again indicates the beam's axis, with such in an undeformed, or undeflected state, and arrows 86, 88 indicate the points of beam support from assemblies 16, 18, respectively. Load weight is applied to beam 20 at points indicated by arrows 90, 92 which lie along lines that contain axes 23, 25, respectively. Application of such weight causes the beam to bow in a manner now to be more fully explained.

According to an important feature of the invention, coupling of load weight to beam 20 through journal shafts 22, 24 and their associated clamps causes bowing deflection of the beam in substantially pure bending. Such is accommodated by slight rotation of the shafts in counterrotative directions, relative to the respective associated clamps. As a consequence, beam deflection is linear with the amount of load weight, and highly accurate load monitoring with a central strain-sensitive device is possible. This kind of deflection is indicated, in exaggerated vertical scale, by dashed line 94 in FIG. 5.

Figure 5:
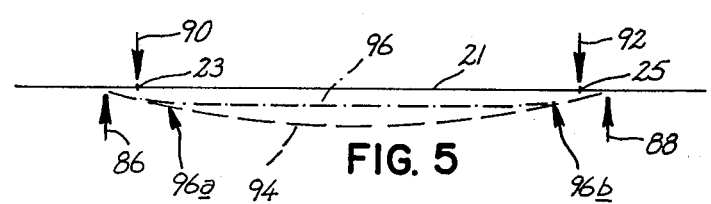
FIG. 5 is a diagrammatic representation, in exaggerated vertical scale, of beam deflection produceable in the present invention.

By way of contrast, and to illustrate an important difference between a common prior art technique, dash-dot line 96 in FIG. 5 shows the kind of beam deformation which would occur if bed 11 were rigidly coupled to the beam. As can be seen, line 96 is characterized by a pair of "local" deformations 96a, 96b at the spaced-apart points where the weight is applied to the beam, with the central, intermediate beam region being substantially unbent. Such action makes accurate load monitoring very difficult.

Deflection of beam 20 under load in the manner just outlined is followed in a well-known way by device 32. With such deflection, the indication provided in the monitoring circuit which is connected to device 32 produces a related indication which is directly interpretable as the amount of load on bed 11 transmitted through suspension 10.

Figure 6:
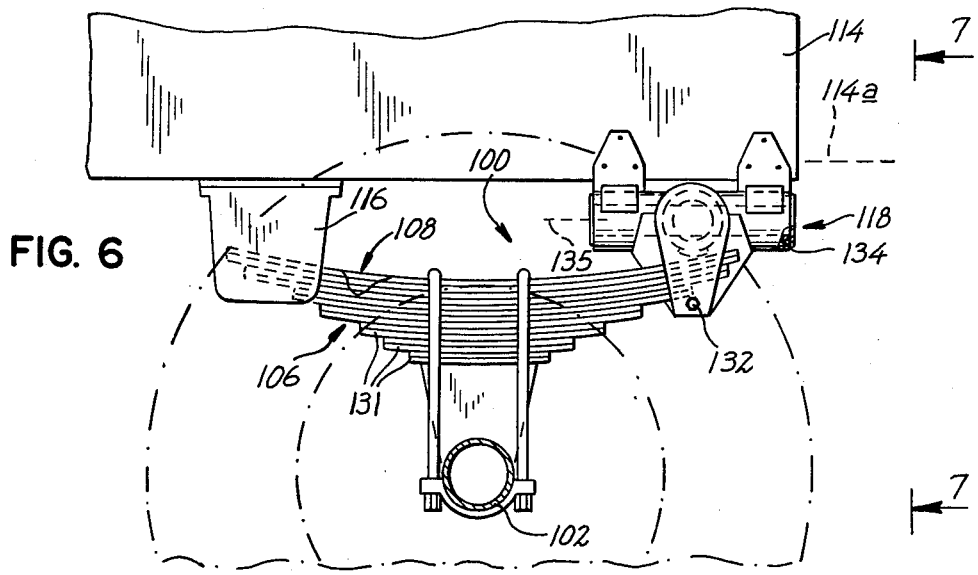
FIG. 6 is a side view of a suspension constructed according to another embodiment of the present invention.
Figure 7:
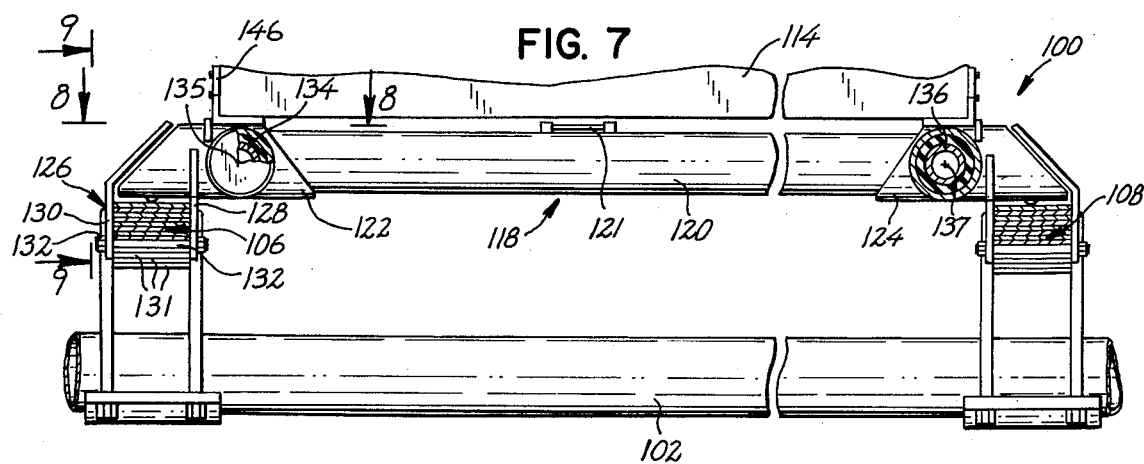
FIG. 7 is a rear view of portions of the suspension of FIG. 6, taken generally along line 7—7 therein.

A second embodiment of the invention takes the form of a single-axle suspension 100 illustrated in FIGS. 6-9. Suspension 100 generally includes a single axle 102 mounting an opposed pair of wheels, and a pair of conventional spring assemblies 106, 108 conventionally attached to axle 102, inwardly of the wheels. A truck bed 114, having a longitudinal axis indicated by dashed line 114a in FIG. 6, is supported on longitudinally spaced end regions of each spring assembly. More specifically, the left-side region of each spring assembly in FIG. 6 is interconnected conventionally to bed 114 through a bed support assembly, such as assembly 116. The right-side region of each spring assembly in FIG. 6 is interconnected to bed 114 through a laterally extending support assembly 118 which extends between, and is joined to, assemblies 106, 108, as seen in FIG. 7.

According to an important feature of the present invention, assembly 118 includes a flexible beam 120, deflection of which is directly related to weight placed on bed 114, which is monitored by a strain-sensitive device 121 (FIG. 7) which is like previously mentioned device 32. Axle 102, assemblies 106, 108 and the wheels are also referred to herebelow as groundtraveling support means.

Looking now at details of suspension 110, beam 120 is a flexible tubular member formed of a suitable steel alloy, or the like. The ends of the beam are truncated along planes which converge upwardly toward the center thereof, as seen in FIG. 7. The opposed beam end regions are encased in a pair of sleeves, 122, 124 having the general shape, in planar projection, seen in FIG. 7. Sleeves 122, 124 and the sleeve-supported ends of beam 120 are attached to assemblies 106, 108, respectively, by support structures, such as structure 126 interconnecting sleeve 122 and assembly 106. Structure 126 includes a pair of laterally spaced plates 128, 130 (FIGS. 7-9) which are attached, as by welding, to sleeve 122 as shown. Plates 128, 130 are spaced apart a distance to receive therebetween upper ones of springs 131 in assembly 106. A bolt 132 extending between lower portions of these two plates connects the same beneath the springs. Sleeves 122, 124 and the associated support structures described with reference to structure 126, are also referred to herebelow as means operatively attaching the ground-traveling support means to beam 120 at a pair of spaced points thereon.

A pair of stub shafts 134, 136 are joined to beam 120 at points therealong which are inwardly of, and symmetrical with respect to, the beam's points of attachment to assemblies 106, 108 respectively. Shafts 134, 136 are tubular in form, and are suitably anchored in longitudinally extending bores formed in sleeves 122, 124, respectively, and in coincident portions of beam 120. The end portions of shafts 134, 136, such as portions 134*a*, 134*b* of shaft 134 (FIG. 8), extend diametrally from opposite sides of beam 120, along axes 135, 137, respectively, which intersect (as can be seen) the longitudinal axes of beam 120.

Figure 8:
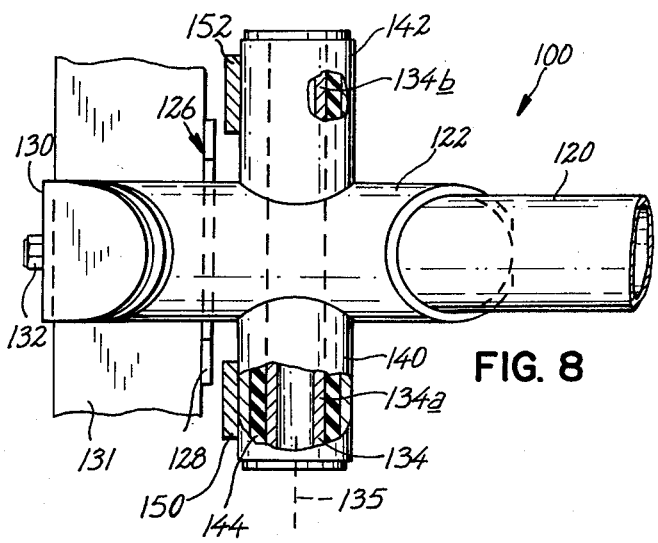
FIG. 8 is an enlarged top view, with parts cut away, taken generally along line 8—8 in FIG. 7.
Figure 9:
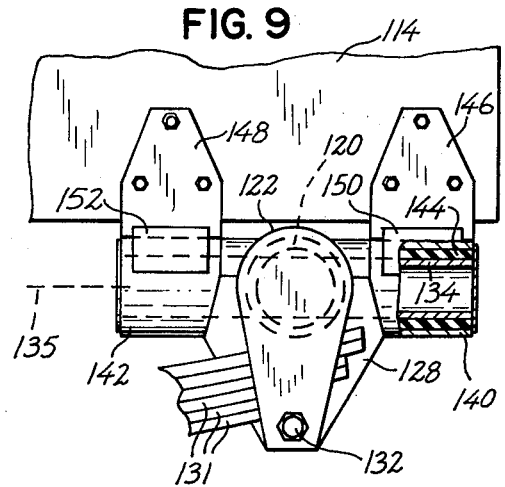
FIG. 9 is an enlarged side view, with parts cut away, taken generally along line 9—9 in FIG. 7.

With reference to FIGS. 8 and 9, each shaft end portion carries thereon a cylindrical casing, such as casings 140, 142 on portions 134*a*, 134*b*, respectively. Tightly interposed between each such casing and its associated shaft end portion is a rubber bushing, such as bushing 144 interposed between casing 140 and portion 134*a*. The just-mentioned casings and bushings are also referred to herebelow as casing means and as elastomeric bushing means, respectively.

Bed 114 is joined to the just-mentioned casings by L-shaped attachment members, such as members 146, 148 attached to casings 140, 142, respectively. With reference to FIG. 9, reinforcing plates, such as plates 150, 152, reinforce the attachment of members 146, 148, respectively. The four attachment members mounted on shafts 134, 136 are suitably secured to bed 114 as shown. Shafts 134, 136, and the associated casings and attachment members, are also referred to herebelow as journal means.

Completing the description of suspension 100, device 121 is centrally mounted on beam 120 in a manner similar to that described above with reference to device 32. Device 121 is connected in a monitoring circuit like that earlier mentioned.

The apparatus just described in this embodiment shown in FIGS. 6-9 performs in substantially the same manner as over the apparatus first described.

From the above, it can be appreciated how the various objects of the present invention are met. In both suspensions 10, 100, through the use of stub-shaft journal connections, vehicle load weight is transferred to a weight-supporting flexible beam, producing a pure-bending deflection of the beam which is directly related to the weight applied. Beam deflection, and hence vehicle load weight transmitted to the beam, is readily monitored by a strain-sensitive device mounted centrally on the beam. Since such a device is not acted upon directly by the load weight borne by the vehicle, the lifetime of the device, and its ease of replacement, are substantially enhanced. Also, the flexible beam configuration described herein is readily adaptable to both single- and twin-axle suspensions.

While preferred embodiments of the present invention have been described hereabove, it is recognized that various changes and modifications may be made without departing from the spirit of the invention.

It is claimed and desired to secure by Letter Patent:

1. Load-measuring means in a vehicle having an elongate load bed and ground-traveling support means, said measuring means comprising
 a flexible beam extending generally transversely of the longitudinal axis of said bed,
 means operatively attaching said support means to said beam at a pair of spaced points thereon,
 journal means mounting said bed on said beam at another pair of points spaced thereon for journaled pivoting of the beam about spaced axes generally paralleling the bed's longitudinal axis and intersecting the beam's longitudinal axis, which other points are generally symmetrical with respect to said first-mentioned pair of points, and
 means mounted on said beam intermediate said pairs of points for monitoring beam deflection related to the weight of load carried on said bed.

2. The load-measuring means of claim 1, wherein said monitoring means includes a strain-sensitive device mounted on a central portion of said beam.

3. The load-measuring means of claims 1 or 2, wherein said journal means includes a pair of shafts joined to said beam with their longitudinal axes coincident with said spaced pivot axes, and casing means mounted on said shafts for rotation relative thereto, and operatively interconnecting said shafts and said bed.

4. The load-measuring means of claim 3, wherein said journal means further includes elastomeric bushing means interposed between said casing means and said shafts, for accommodating limited rotational movement therebetweeen.

* * * * *